June 19, 1956 — L. P. LEIGH — 2,750,737
DEICING APPARATUS FOR JET ENGINES
Filed April 20, 1953 — 2 Sheets-Sheet 2
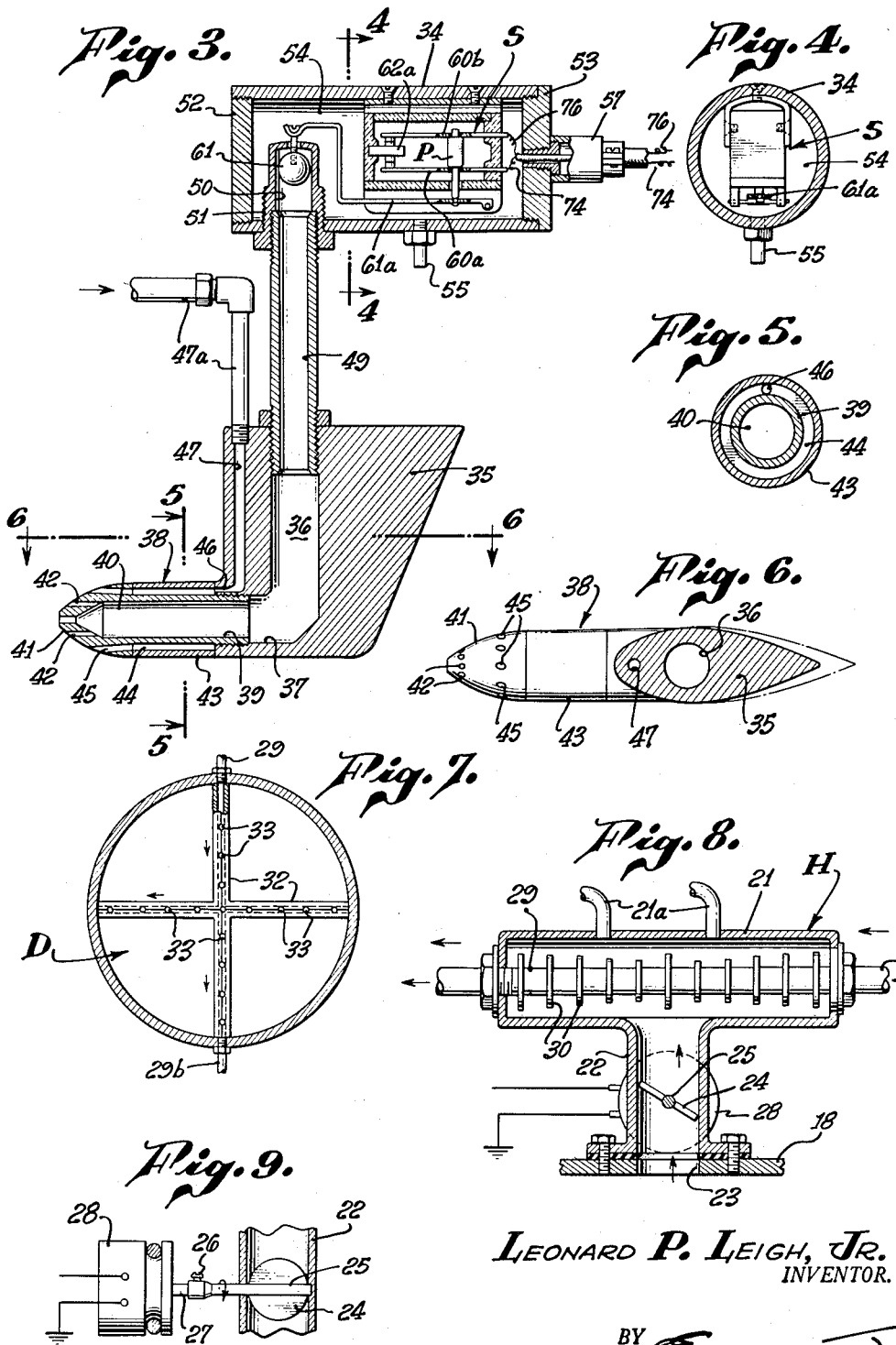
Leonard P. Leigh, Jr.
INVENTOR.
BY
ATTORNEY.

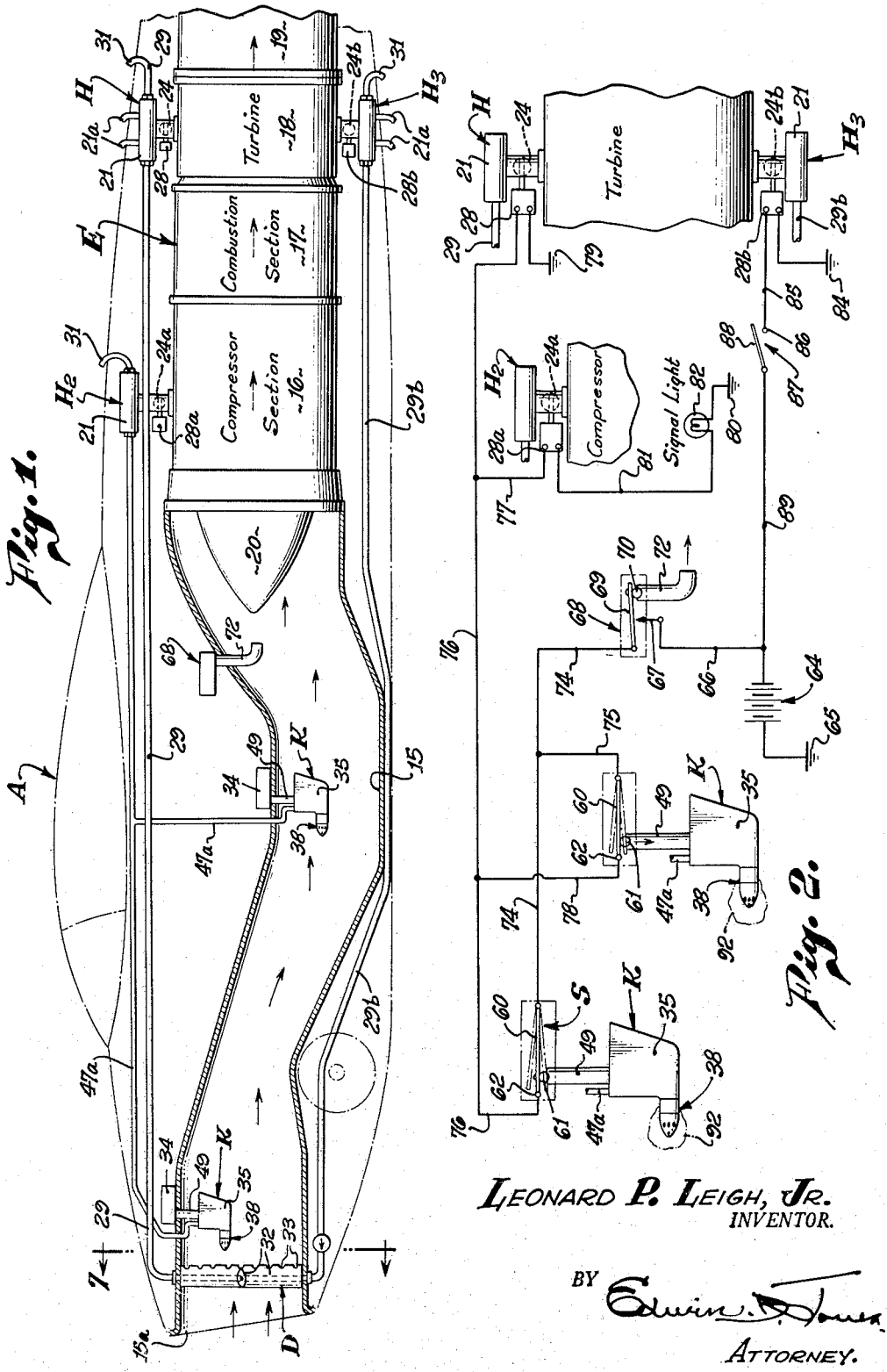

United States Patent Office 2,750,737
Patented June 19, 1956

2,750,737

DEICING APPARATUS FOR JET ENGINES

Leonard P. Leigh, Los Angeles, Calif.

Application April 20, 1953, Serial No. 349,735

14 Claims. (Cl. 60—39.09)

My invention relates to deicing apparatus for jet engines as used for propelling aircraft and of the type embodied in my co-pending application, Serial No. 127,408, filed November 15,1949, now Patent No. 2,711,453, and wherein a source of hot air under pressure is, through opening of a normally closed valve, supplied to the air intake duct of a jet engine to prevent icing thereof, the valve being automatically opened by a control means positioned in the air intake duct, when ice formation on such means occurs. The control means includes a normally closed electrical switch adapted to be opened by an actuator that is only responsive to positive air pressure produced in the duct by the air stream flowing therethrough, so that the switch is normally maintained opened until ice forms on a nozzle to discontinue air supply to the actuator, when the switch is automatically closed to effect opening of the valve.

However, aircraft operate under many different conditions and a more flexible deicing control is needed than is provided by the apparatus of the above referred to application. As is known, at high aircraft speeds the ram air in the forward portion of the engine inlet duct may result in very high pressures, while at the same time the pressure in the inlet duct downstream of this forward portion may be much less. Also, at lower aircraft speeds the air pressure in the forward portion of the inlet duct will be considerably lower than at the above referred to high speeds. Thus, the deicing control apparatus should be responsive to various air pressures and airflow in the inlet duct and the present invention is adapted to provide such a control and it is a purpose of my present invention to provide a deicing apparatus of this character in which a control means is provided for the hot air control valve that is responsive to either negative or positive air pressure occurring in the engine intake duct to maintain the actuator in a position in which the electrical switch is opened, but when the nozzle of the control means is closed by ice formation thereon, the actuator is moved to close the switch.

For example, and with the foregoing in mind, when the aircraft is operating at high speeds the ram air in the forward portion of the engine inlet duct effects the above referred to positive pressure with the control device nozzle subjected to this ram air. Further back in the duct the pressure is not so great and the airflow past the control device nozzle located in this region of the duct, will result in a negative pressure in said nozzle, and, hence, in the control device thereof. At lower aircraft speeds the pressure at the forward end of the engine inlet duct will be substantially less than the ram air pressure, and the airflow past the nozzle of the control device at the forward end of said duct may effect a negative pressure in said control device.

Another purpose of my invention is the provision in a deicing apparatus of a valve control means which is operable to effect deicing thereof intermittently to produce flashing of a light signal to indicate to the pilot of the aircraft that the aircraft is traveling through moisture saturated air at highly freezing temperatures.

Another purpose of my invention is the provision in a deicing apparatus of this character, means by which hot air under pressure can be supplied to the air intake duct of the engine which is under the control of the pilot, so that in that emergency which occurs when the aircraft is traversing moisture laden air at relatively high freezing temperatures as indicated by the flashing of the light signal, the pilot can cause the supply of hot air under pressure and at a greatly increased temperature from that air supplied to the duct through the control means, to effectively prevent icing of the engine under these extreme conditions.

Still another purpose of my invention is the provision of a deicing apparatus which embodies a master control switch that is normally open when the aircraft is not in motion, so as to maintain the apparatus inactive, and which is automatically closable to set the apparatus into operation immediately upon the aircraft leaving the ground.

Other purposes and advantages of the invention will appear from the following part of the specification.

Referring to the drawings, which are for illustrative purposes only,

Fig. 1 is a view showing in phantom an aircraft in elevation, a conventional type of jet engine applied to the aircraft, one form of deicing apparatus for the engine embodying the invention, and one form of control means for the apparatus also embodying the invention;

Fig. 2 is a diagrammatic view showing the wiring arrangement of the electrical system;

Fig. 3 is an enlarged vertical section through one of the control devices;

Fig. 4 is a sectional view taken on line 4—4 of Fig. 3;

Fig. 5 is a sectional view taken on line 5—5 of Fig. 3;

Fig. 6 is a sectional view taken on line 6—6 of Fig. 3;

Fig. 7 is an enlarged sectional view taken on line 7—7 of Fig. 1;

Fig. 8 is an enlarged vertical section of an air heater of the apparatus; and

Fig. 9 is a fragmentary sectional view of the heater inlet, and an elevational view of the device for actuating the inlet valve.

Referring more particularly to the drawings, there is shown in Fig. 1 a conventional aircraft A having a conventional jet engine E, with the rear end broken away. The engine comprises the usual air intake duct 15 which leads to the compressor 16 the latter in turn communicating with the combustion chamber 17 which leads to the turbine 18 to which the exhaust 19 is attached. There is the usual conical or fairing cone 20 positioned in the duct 15 ahead of the compressor to uniformly distribute the air to the latter.

The deicing apparatus comprises an air heater H having a casing 21 with a lateral extension between its ends constituting an inlet 22 for hot gases from the turbine 18, the extension being connected to an outlet port 23 in the turbine housing.

Means for controlling the flow of hot gases from the turbine 18 to the casing 21 comprising a valve of any suitable type but shown as being a butterfly valve 24 which is fixed to a shaft 25 having an end projecting from the extension and secured, by means of a set screw 26, to the shaft 27 of a rotary solenoid device 28 or other suitable form of electro-responsive device which, when energized, operates to rotate the valve to open posititon, and when deenergized moves the valve to closed position.

As shown in Fig. 8, the heater casing 21 is associated with an air conducting conduit 29 which extends through the casing and is provided with fins 30 to accelerate heat transfer from the hot turbine gases to the conduit so that the air flowing through the latter will be heated to the required degrees for effective deicing as will be described hereinafter. The casing is provided with one or more outlet pipes 21a which lead to the leading edges of the wings of the aircraft so the heat of the gases passing through said pipes may be used to deice the leading edges.

Under forward movement of the aircraft, air is caused to flow through the conduit 29 by extending its rear end upwardly and forwardly, as shown in Fig. 1, to provide a forwardly facing inlet 31. Likewise, as shown in Fig. 1, the conduit 29 leads to a hot air distributing header D located in the duct 15 adjacent the inlet end 15a thereof. The header comprises tubes 32 fixed in and radiating from the center of the duct 15, the tubes having a streamlined contour in cross section, and their rear sides provided with outlets 33 through which the hot air delivered thereto from the pipe 29 is discharged rearwardly into the intake duct.

One or more devices K are embodied in the apparatus to control one or more electrical switches S for energizing the solenoid 28 from a source of current, to open the valve 24. In the present instance two control devices K are shown, one being located in the intake duct 15 immediately to the rear of the header D, the other being at an intermediate point in the duct 15.

The devices K are identical in construction and, as shown in Figs. 3 to 6, each comprises a switch housing including a casing 34, and a member 35 disposed below the housing, the member 35 being streamlined in cross section, as best shown in Fig. 6. Within the member 35 is a generally L-shaped passage the vertical portion 36 of which extends from the upper end of member 35, the horizontal portion 37 of the passage extending forwardly of the member. There is airflow and pressure sensing means comprising a nozzle indicated generally at 38, which comprises a tubular portion 39 having a rear end portion received within the passage portion 37. Within the tubular portion 39 of the nozzle is a longitudinally extending passage 40 and the forward end or head of said nozzle is cone shaped, as indicated at 41, with the apex facing the air stream. A plurality of small openings 42 are provided in the head, which have their inlets facing the airstream in duct 15 and have their outlets communicating with passage 40.

The nozzle head is of larger diameter at the rear end than the outside diameter of the tubular portion 39 and immediately behind the head is a sleeve 43 of larger inside diameter than the outside diameter of the tubular portion 39 to provide an annular heating chamber 44 about the portion 39. There are a plurality of outlet openings 45 in the head 41 which connect the forward end of the chamber with the exterior of the head adjacent the rear end or base. The rear end of the chamber 44 has a hot air inlet 46 which is the lower terminal end of a passage 47 extending vertically in the forward part of the member 35. The upper end of the passage 47 is connected, by means of pipe 47a, with a heater H2 which is of similar construction as heater H and is connected with the compressor 16 in a manner similar to the connection of heater H with the turbine 18. The heater H2 has an inlet valve 24a controlled by a solenoid device 28a.

The member 35 is connected to the housing 34 by means of a conduit 49 having a lower threaded end screwed into the tapped upper end of passage 36. The upper end of conduit 49 is threaded and screwed into the internally threaded portion of a passage 50 in a fixture 51 which is externally threaded and screwed into a threaded opening provided therefor in the casing 34. The ends of casing 34 are internally threaded for reception of plugs 52 and 53 which provide end walls so that the interior of the casing comprises a sealed chamber 54 having a connection 55 with ambient atmosphere. Thus the pressure in chamber 54 is substantially that of ambient atmosphere.

Within chamber 54 is suitably mounted a switch S, the wires for which enter the chamber 54 by means of a suitable plug 57 of any well known type which will prevent the passage of air into chamber 54 past the wires.

Switch S is shown diagrammatically in Fig. 2 as comprising a movable contact member 60 which is adapted to be actuated by a differential pressure responsive element comprising a ball 61 attached to the free end of the member 60. The ball is located within the upper end portion of passage 50 of fixture 51, and when the ball is subjected to suction in passage 50 it will move the switch member 60 in one direction to an open position and when the ball is subjected to a positive pressure of predetermined value or above, it will move the switch member in the opposite direction to an open position. Normally the switch member 60 is in an intermediate position whereat it engages a fixed switch member 62 so as to close switch S.

In practice the switch S is preferably constructed as shown in Fig. 3 wherein a fixed contact 62a and a pair of movable contact members 60a and 60b respectively, each normally contacting the fixed contact 62a. There is a plunger P disposed between the movable contact members 60a and 60b, which is of insulating material and connected to a pivoted lever 61a to the free end of which a ball 61 is connected. Wire 74 is connected to the contact member 60a and wire 76 is connected to contact member 60b.

When the lever 61a is in the intermediate position the switch is closed. When it is moved downwardly by negative pressure on the ball 61 the plunger P is moved downwardly and switch contact member 60a is moved out of contact with member 62a thus opening the switch. When the lever is moved upwardly from the intermediate position by positive pressure exerted on ball 61 the plunger P is moved upwardly to move contact member 60b out of contact with the fixed member 62a thus again opening the switch.

The electrical system includes a source of power, indicated as a battery 64, which is grounded at 65. The battery also has a wire connection 66 which leads to a fixed terminal or contact 67 of a master switch, indicated generally at 68. Master switch 68 has a movable switch member 69 normally out of contact with contact member 67 but which is adapted to be moved into contact therewith by a suction responsive member comprising a ball 70 attached to the member 69 adjacent its end, the ball 70 being operably disposed in one end of a tube 72 located in the air stream within duct 15 adjacent the upstream end of the engine E. The lower end of tube 72 is turned rearwardly so that its open end faces downstream and the flow of air therepast will produce a negative pressure or suction within the tube 72. This suction will act on ball 70 to cause it to close switch 68.

Movable switch member 69 is connected by means of wire 74 to the movable switch member 60 of switch S of the device K located adjacent the header D. There is also a branch wire 75 leading to the switch member 60 of the intermediate device K. The fixed switch member 62 of device K adjacent the header is connected with the solenoid devices 28 and 28a by wire 76 and branch wire 77 and the fixed contact 62 of the intermediate device K is connected to wire 76 by a wire 78. Solenoid device 28 is grounded at 79 while solenoid device 28a is grounded at 80 by means of a connection 81 which includes a signal light 82 interposed therein.

The present apparatus also includes an emergency heater H3 which is of similar construction to heater H and is connected to the turbine 18 in a manner similar to the connection of heater H with the turbine. Heater H3 is provided with an inlet valve 24b controlled by a solenoid device 28b and there is a conduit 29b from the heater H3 to the header D. The solenoid device 28b is grounded at 84 and has a connection 85 with a contact 86 of an emergency switch, indicated generally at 87. Movable contact member 88 of switch 87 is connected with wire 66 by means of a wire 89.

As is well known ram air enters the duct 15, and under certain conditions ice will form within the duct. This ice restricts the air flowing to the engine and sometimes pieces of such ice break off and enter the compressor. Some of these pieces of ice may be of such size and hardness as to seriously damage the compressor. The present invention is adapted to eliminate this difficulty.

When the aircraft is making ready for flight as by setting the engine into operation, as well as when ascending into flight, the master switch 68 remains open and closes only when the airflow in the duct 15 becomes sufficient to open the switches S. Thus setting the apparatus into condition for operation prematurely, is prevented. The manner in which the switches S are actuated is as follows:

Under some operating conditions there is a positive pressure set up in the passage 40 of the nozzles of the control devices and the passages 37 and 36 thereof so that the balls 61 are urged upwardly, as shown in the drawings, to open the respective switches S of the devices K. Under other operating conditions a negative pressure or suction is created in the devices K so that the balls 61 are pulled downwardly. In either event the switches S are opened. Substantially concurrently therewith the master switch 68 closes under the degree of suction now created in the tube 72, thus making the apparatus ready for operation in the manner intended, and as will now be described.

Should ice form on the nozzle of either device K, as indicated at 92, actuating pressure on the ball 61 thereof ceases and the switch member 60 returns to the intermediate position whereat it contacts member 62 thereby closing switch S and energizing solenoid devices 28 and 28a. The valves 24 and 24a are then opened and hot air is supplied to the header D and to the chambers 44 of the nozzles of the devices K. Thus the air entering the duct 15 is heated and the nozzles 41 are also heated to melt the ice formed thereon. When the ice has melted from the nozzle or nozzles the switch or switches S open again to cut off the heat to the header as well as to the nozzles.

When either of the switches S closes the signal light 82 flashes on, and when said switches S open the light goes off. Should the icing conditions be serious and the nozzles quickly ice up again the light will flash on again, and if the condition continues the pilot will know the icing conditions are serious. He will then close the emergency switch 87 to provide the header D with additional hot air from the heater H3 which will provide sufficient additional heat to deice the duct 15 and prevent further icing therein.

It is important to note that the master switch 68 remains closed during flight of the aircraft, but once the aircraft lands the suction produced in the tube 72 is so decreased that the switch now opens. Similarly, the actuating pressures for maintaining the switches S open no longer exist, and therefore such switches close, but the apparatus is not rendered active thereby because the master switch has been opened.

Although I have herein shown and described only one form of deicing apparatus embodying my invention, it is to be understood that various changes and modifications may be made herein without departing from the spirit of my invention and the spirit and scope of the appended claims.

What I claim is:

1. In deicing apparatus for the air inlet duct of jet engines: means for supplying hot air to the inlet end of said duct; a control device including a part for sensing airflow and pressure within said duct to create positive and negative actuating pressures; means for supplying hot air to said sensing part for heating same; and means for controlling the supply of hot air to said duct inlet and to said sensing part, including a pressure responsive member responsive to said positive and negative actuating pressures respectively, said pressure responsive member having one control position for effecting a supply of hot air to said duct inlet and to said sensing part, said member having another position to which it is moved by said positive pressure to effect stopping of said supply of hot air, and having a third position to which it is moved by said negative pressure to effect stopping of the supply of hot air.

2. In deicing apparatus for the air inlet duct of jet engines having a compressor and a turbine: a header adjacent the inlet of said duct for discharging hot air into the air entering said duct; an air heating device connected to said turbine and having a connection with said header for supplying hot air thereto; electrically operable means for controlling the heating device; a control device disposed in said air inlet duct immediately behind said header, said control device including a switch chamber; means connecting said chamber to ambient atmosphere; a nozzle having a passage leading to said chamber, said nozzle having a cone shaped head with the apex facing the air stream, said nozzle having a plurality of relatively small openings therein facing the air stream and connected with the nozzle passage; a sleeve about the nozzle to define a heating chamber having outlet openings adjacent the base of said head and extending forwardly from said heating chamber; a second heating device connected with the compressor; means connecting said second heating device with the heating chamber of said nozzle; electrically operable means for controlling said second heating device; a source of electrical current for said electrically operable means, said switch including a movable switch member for controlling the electric current to said electrically operable means, said movable switch member normally in switch closed position; a ball member subjected and responsive to the differential of pressure between that in the switch chamber and pressure derived from said nozzle, said pressure being a positive pressure under certain operating conditions and a negative pressure under other operating conditions.

3. The invention defined by claim 2 including means for controlling the operation of the electrically operable means, including a master electric switch; and means responsive to airflow and pressure in the inlet duct for controlling said master switch and effecting closing of said switch when the air flow through the inlet duct is of a predetermined value.

4. The invention defined by claim 2, including an electric signal lamp controlled by the switch of said control device and energized upon closing of said switch and actuation of the electrically operable means; a third heating device connected to the header; electrically operable means for controlling said third heater; and means, including a manually operable switch, for controlling the last mentioned electrically operable means.

5. A control device, comprising: a switch chamber; means connecting said chamber to a region of relatively low pressure; a nozzle having a passage connected with said chamber, said nozzle having a cone shaped head with the apex thereof facing outwardly, said nozzle having a plurality of relatively small openings in the curved face of said head which are connected with the nozzle passage; a sleeve about the nozzle to define a heating chamber having an inlet at one end and a plurality of forwardly extending outlet openings which have their outlets adjacent the base of the head; a switch in said switch chamber for controlling an electric circuit, said switch having a movable switch contact member normally contacting a second contact member; and a ball responsive and subjected to the differential of pressure between that in said switch chamber and that in said passage, said ball being connected to said movable switch member for actuating same.

6. The invention defined by claim 5 wherein said movable switch member has two off positions, one at one side of the second contact member and the other at the opposite side of said second contact member and said ball is adapted to move said movable switch member to one or the other of said off positions under respective predetermined differential pressure conditions.

7. In a control device: a switch having a fixed contact and a pair of movable contact members normally engaging said fixed contact; and means for actuating said movable contact members, said means including a pressure responsive element which, when moved by one predetermined pressure from an intermediate position to another position will disengage one of said movable contacts from the fixed contact, and when said pressure responsive element is moved by another predetermined pressure from said intermediate position to still another position the other of said movable contact members will be disengaged from said fixed contact.

8. In deicing apparatus for the air inlet duct of jet engines: means for supplying hot air to the inlet end of said duct; a control device including a part for sensing air flow and pressure within said duct to create positive and negative actuating pressures; and means for controlling the supply of hot air to said duct inlet, including a pressure responsive member responsive to either the positive actuating pressure or the negative actuating pressure.

9. In deicing apparatus for the air inlet duct of jet engines: means for supplying hot air to the inlet end of said duct; a control device including a part for sensing air flow and pressure within said duct to create positive and negative actuating pressures; means for supplying hot air to said sensing part for heating same; and means for controlling the supply of hot air to said duct inlet and to said sensing part, including a pressure responsive member responsive to either the positive actuating pressure or the negative actuating pressure.

10. In deicing apparatus for the air inlet duct of jet engines: means for supplying hot air to the inlet end of said duct; a control device including a part for sensing pressure within said duct to create negative and positive actuating pressures; means for supplying hot air to said sensing part for heating same; and means for controlling the supply of hot air to said duct inlet and to said sensing part, including a pressure responsive member responsive to either of said actuating pressures, said pressure responsive member having a position it assumes normally when not subjected to either of said actuating pressures of a predetermined value for effecting a supply of hot air to said duct inlet and to said sensing part, there being another position to which said pressure responsive member is moved by either of said actuating pressures to effect stopping of said supply of hot air.

11. A control device, including: a switch having a movable contact member; an element for controlling said contact member responsive to positive and negative pressures; and a nozzle having a sensing part upon which ice may form, said sensing part being adapted to provide a negative or a positive pressure to which one side of said element may be subjected, said sensing part having a plurality of openings therein for sensing air flow and pressure, said nozzle having a heat chamber located so as to effect deicing of said nozzle when heated air is supplied to said chamber.

12. In deicing apparatus for the air inlet duct of jet engines: means for supplying hot air to the inlet end of said duct; a control device disposed in said air inlet duct to the rear of said means, said control device including a part for sensing pressure within said duct to create an actuating pressure; means for supplying hot air to said sensing part for heating same; means for controlling the supply of hot air to said duct inlet and to said sensing part including a pressure responsive member responsive to said actuating pressure, an electrically operable means controllable in part by said member; a master electric switch coacting with said member to control said electrically operable means; and means responsive to air flow and pressure in the inlet duct for controlling said master switch and effecting closing thereof when the air flow through the inlet duct is of a predetermined value.

13. In deicing apparatus for the air inlet duct of jet engines having a compressor and a turbine; a header adjacent the inlet of said duct for discharging hot air into the air entering said duct; an air heating device connected to said turbine and having a connection with said header for supplying hot air thereto; electrically operable means for controlling the heating device; a control device disposed in said air inlet duct to the rear of said header, said control device including an electric switch urged to closed position, a part for sensing air flow and pressure within said duct to create an actuating pressure for opening said switch, and a heat chamber located so as to effect deicing of said part when heated air is supplied to said chamber; a second heating device connected with the compressor and having a connection with said heat chamber part; electrically operable means for controlling said second heating device; a source of electric current for both of said electrically operable means; said switch controlling in part the electric current to both of said electrically operable means, a master electric switch also controlling in part the electric current to both of said electrically operable means; and means responsive to air flow and pressure in the inlet duct for controlling said master switch and effecting closure of said switch when the air flow through the inlet duct is of a predetermined value.

14. The control device for deicing apparatus for aircraft, including a nozzle having a duct therein, said nozzle having a sensing part upon which ice may form, said sensing part having a plurality of openings leading to the duct and sensing airflow and pressure to create positive and negative actuating pressures in the duct; a pressure-responsive element in communication with the duct and responsive to either the positive actuating or the negative actuating pressure; and means controlled by said element for deicing the nozzle to clear said opening.

References Cited in the file of this patent

UNITED STATES PATENTS

| | | |
|---|---|---|
| 2,182,530 | Baer | Dec. 5, 1939 |
| 2,469,375 | Flagle | May 10, 1949 |
| 2,529,775 | Maddox | Nov. 14, 1950 |
| 2,541,512 | Hahn | Feb. 13, 1951 |

FOREIGN PATENTS

| | | |
|---|---|---|
| 213,362 | Switzerland | Jan. 31, 1941 |